United States Patent [19]
Pirillo

[11] Patent Number: 5,361,401
[45] Date of Patent: Nov. 1, 1994

[54] CHANNEL HOPPING RADIO COMMUNICATION SYSTEM AND METHOD

[75] Inventor: Paul M. Pirillo, Sugar Hill, Ga.

[73] Assignee: NCR Corporation, Dayton, Ohio

[21] Appl. No.: 808,830

[22] Filed: Dec. 17, 1991

[51] Int. Cl.⁵ ............................................. H04B 15/00
[52] U.S. Cl. ..................................... 455/62; 370/94.1; 370/95.1
[58] Field of Search ................... 455/53.1, 62, 63, 65, 455/161.1, 161.2, 161.3, 165.1, 186.1, 186.2, 185.1; 379/61; 370/94.1, 95.1, 95.3

[56] References Cited

U.S. PATENT DOCUMENTS

| | | | |
|---|---|---|---|
| 3,487,312 | 12/1969 | Egan et al. | 455/62 |
| 3,505,479 | 4/1970 | Hodge | 370/17 |
| 3,617,891 | 11/1971 | Covill | 455/62 |
| 4,115,661 | 9/1978 | Schmidt | 370/95.3 |
| 4,140,973 | 2/1979 | Stevens | 455/62 |
| 4,355,399 | 10/1982 | Timor | 375/1 |
| 4,479,215 | 10/1984 | Baker | 371/33 |
| 4,554,668 | 11/1985 | Deman et al. | 375/1 |
| 4,679,207 | 7/1987 | Tsuda | 375/1 |
| 4,716,573 | 12/1987 | Bergstrom et al. | 375/1 |
| 4,752,939 | 6/1988 | Amoroso et al. | 375/1 |
| 4,965,849 | 10/1990 | Kunihiro | 455/63 |
| 5,044,010 | 8/1991 | Frenkiel et al. | 379/61 |

*Primary Examiner*—Reinhard J. Eisenzopf
*Assistant Examiner*—Andrew Faile
*Attorney, Agent, or Firm*—Paul W. Martin; Richard W. Lavin

[57] ABSTRACT

There is disclosed a method for transmitting data over a transmission channel from a base station to one of a plurality of remote terminal devices including the steps of storing in a first table the communication channels for each of the terminal devices which were open for the last communication to the terminal device, selecting from the first table a communication channel which was successful in communicating to the said one of a plurality of remote terminal devices and transmitting data over the selected communication channel.

13 Claims, 5 Drawing Sheets

END | START

CYCLE REPEATS

PREAMBLE | DATA FIELD | TRAILER

TABLE I

| TERMINAL | VALID CHANNEL | INVALID CHANNEL |
|---|---|---|
| 1 | 4 | 1,4 |
| 2 | 3 | 4 |
| 3 | 4 | 3,4 |
| 4 | 2 | 4 |
| 5 | 1 | 4 |
| ⋮ | ⋮ | ⋮ |
| N | N | N |
|   |   |   |

TABLE II

| LOGICAL CHANNEL | PHYSICAL CHANNEL |
|---|---|
| 1 | 93 MHZ |
| 2 | 99 MHZ |
| 3 | 91 MHZ |
| 4 | 97 MHZ |
| 5 | 95 MHZ |
|   |   |

CHANNEL HOPPING RADIO COMMUNICATION SYSTEM AND METHOD

BACKGROUND OF THE INVENTION

The present invention relates to communications systems and, more particularly, to a communication system used in a data processing system between a base station and a plurality of remote data terminal devices.

In data processing systems which include either a host processor and a plurality of remote data terminal devices or a master and a plurality of slave terminal devices, communication is accomplished in many systems using RF radio communications in which information is transmitted over predefined radio frequency channels. The major types of transmission systems are either phase shift systems in which wide band modulation is obtained at a given frequency, or else a rapid or frequency-hopping system in which information is transmitted for a short period on a carrier of given frequency, and is then transmitted on a carrier of different frequency chosen according to a predetermined code. Frequency hopping systems incur overhead requiring the transmitted sequence on each frame of data to hop into a channel regardless of the presence of an interfering signal or the occurrence of multipath fading in that channel, thus increasing the bit error rate.

SUMMARY OF THE INVENTION

There is provided, in accordance with the present invention, a communication system including a base station and a plurality of remote terminal devices in which the devices transmit and receive on a single frequency channel at any particular instant but are capable of tuning automatically to other channels when unwanted signals are detected. A lookup table lists the channels available and which were interference free in previous transmissions.

It is therefore a principal object of this invention to provide a reliable RF communication system where interfering signals and/or multipath fading are present.

It is a further object of this invention to enhance the reliability and throughput capacity of polling in an RF communication system.

BRIEF DESCRIPTION OF THE DRAWINGS

These and other objects, features, and advantages of the present invention will become more apparent to those skilled in the art and in light of the following detailed description taken in consideration with the accompanying drawings wherein like reference numerals indicate like or corresponding parts throughout the several views and wherein.

DETAILED DESCRIPTION OF THE PREFERRED EMBODIMENT

Figure 1:
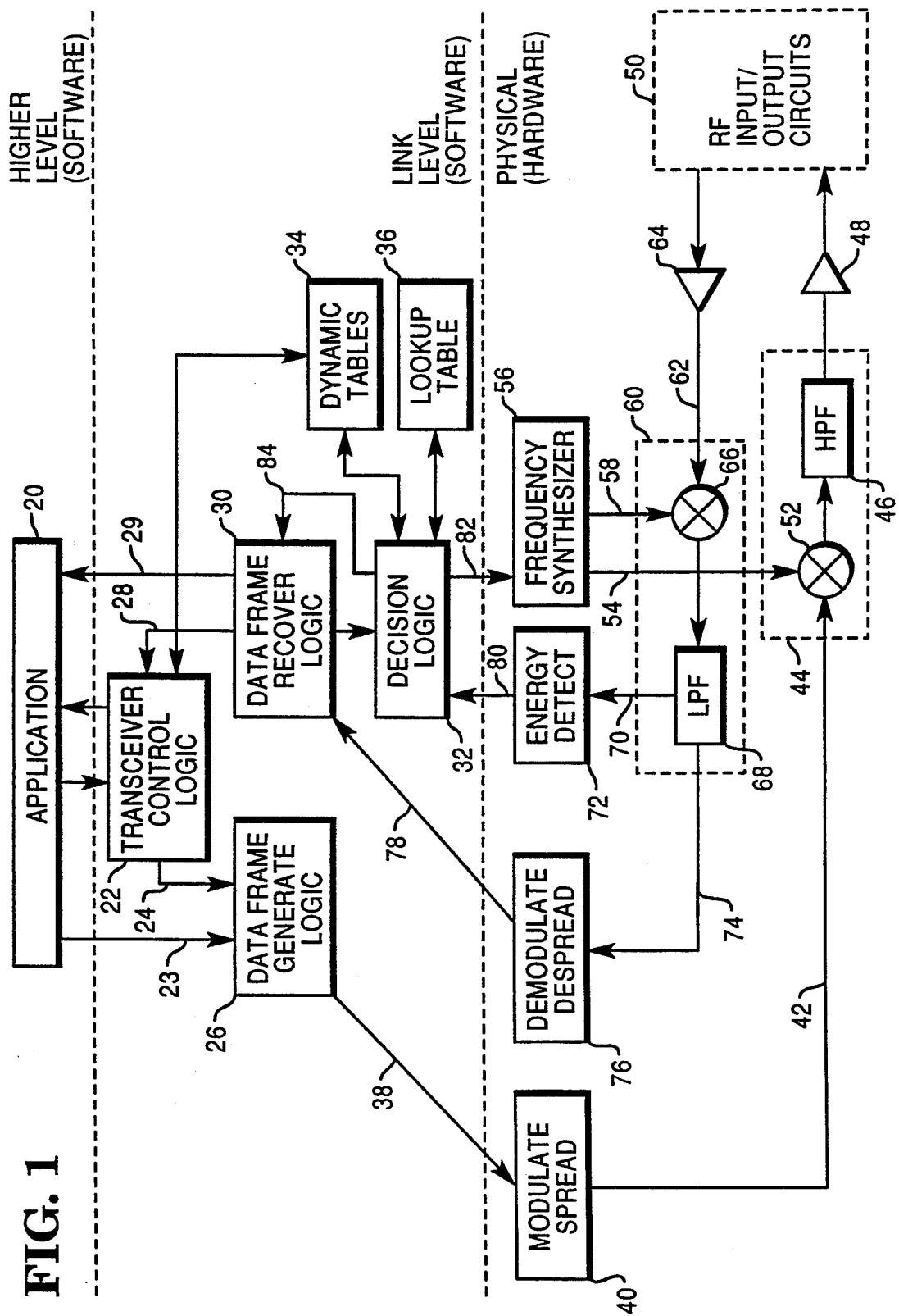
FIG. 1 is a block diagram of the hardware/software elements used in a communication link between a base station and a remote terminal device in accordance with the present invention.
Figures 4A, 4B, 5:
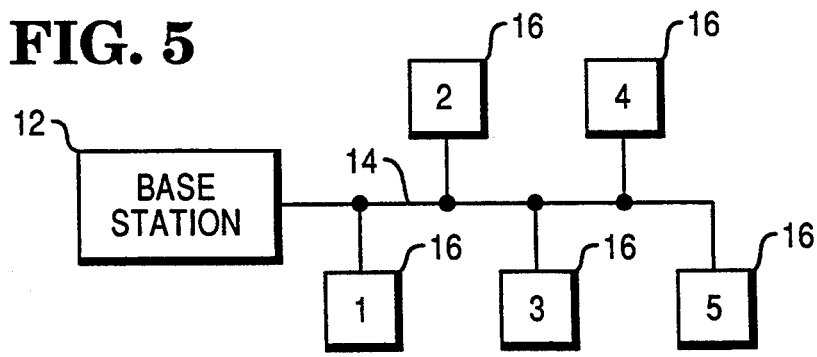
FIG. 4A is a diagram illustrating a dynamic table found in element 34 of FIG. 1.
FIG. 4B is a diagram illustrating the lookup table found in element 36 of FIG. 1.
FIG. 5 is a block diagram of the data processing system in which the present invention is used.

Referring first to FIG. 5, there is shown a block diagram of the data processing system associated with the present invention which includes a base station 12 which may be a host processor connected over a communication line 14 to a plurality of remote terminal devices 16 for transmitting and receiving frames of data in a manner that is well known in the art. Referring to FIG. 1, there is disclosed a block diagram of the hardware/software elements located in the base station 12 and in each of the remote terminal devices 16 used as part of the communication system between the base station 12 and one of the remote terminal devices 16 in accordance with the present invention. The present discussion will cover the transmission of data between the base station and a remote terminal device with the understanding that the same operation occurs when a terminal device is transmitting a frame of data to the base station.

Included in FIG. 1 is an application software element 20 which controls the operation of the base station 12 in transmitting or receiving a packet or frame of data in a manner that will be described more fully hereinafter. The application software element 20 is coupled to a transceiver control logic element 22 which controls the generation and the recovery of a data frame in addition to controlling the selection of the transmission channel over which the data frame is be transmitted. To accomplish this, the transceiver control logic element 22 is coupled over line 24 to a data frame generate logic element 26 and over line 28 to a data frame recover element 30.

The data frame recover logic element 30 is coupled to a decision logic element 32 which will determine the frequency channel the data frame is to be transmitted in a manner that will be described more fully hereinafter. Associated with the logic element 32 is a dynamic tables element 34 which contains a table (FIG. 4A) for each of the terminal devices associated with the base station for storing information concerning the channel used in a previous transmission to that terminal device which was successful. Further associated with the logic element 32 is a lookup table element 36 (FIG. 4B) which lists the corresponding channel frequency for each transmission channel available to the base station for use in transmitting the data frame.

The data frame generate logic element 26 is coupled over line 38 to a modulate spread element 40 which modulates the data frame received from element 26 onto a carrier which is transmitted over line 42 to a mixer element 52 in an up converter portion 44 of the base station 12 (FIG. 5). The mixer element 52 receives over line 54 from a frequency synthesizer element 56 the channel frequency at which the data frame is to be transmitted. The synthesizer element 56 will generate the required frequency in response to information transmitted from the decision logic element 32. The transmission frequency is transmitted through a high pass filter 46 and an amplifier 48 to the RF input/output circuits element 50 for transmission over the communication line 14 (FIG. 5) to the remote terminal devices 16 enabling the designated terminal device to detect its ID number in the data frame in a manner that is well known in the art.

When one of the terminal devices 16 is transmitting a data frame to the base station 12, the received information is transmitted from the element 50 through an amplifier 64 and over line 62 to a mixer element 66 located in a down converter portion 60 of the base station 12. The mixer element 66 receives over line 58 the frequency outputted from the synthesizer element 56 which is multiplied against the incoming signal and transmitted through a low pass filter element 68 which outputs the signal over line 74 to a demodulate despread element 76 which demodulates the signal and transmits the resulting data frame over line 78 to the data frame recover element 30 which constructs a data frame. The low pass filter element 68 will output the signal level information over line 70 to a energy detect element 72 which transmits the signal information to the decision logic element 32 which updates the dynamic tables element 34 and the lookup table element 36. The logic element 32 also transmits controls signals over line 84 to the data frame recover element 30 for controlling its operation to piece together the modulated information appearing on line 78 into a frame of data if possible.

Figure 2:
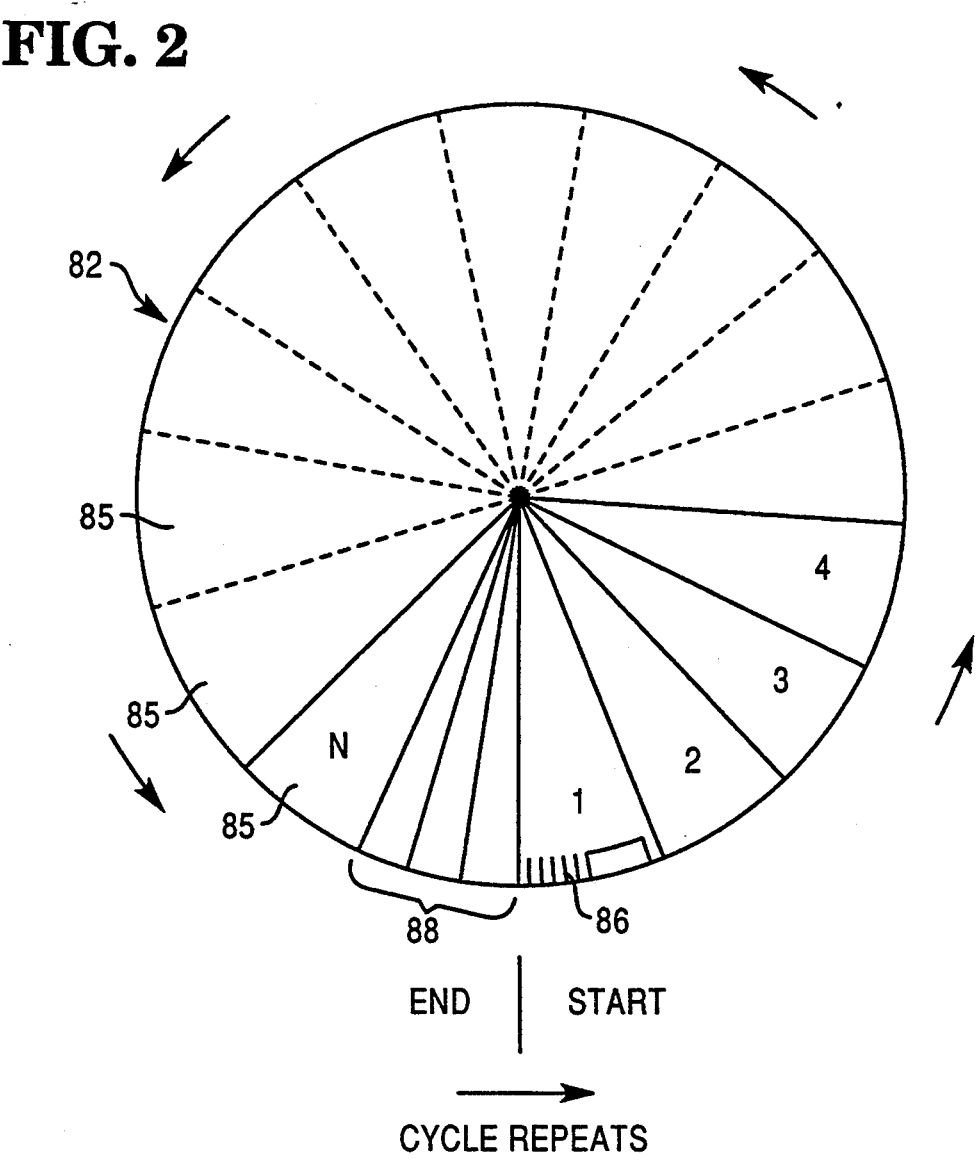
FIG. 2 is a diagram illustrating the polling sequence utilized by the base station showing the time periods during which data is transmitted between the base and the remote terminal.

Referring to FIG. 2, there are illustrated the protocols used by the base station 12 in polling the remote terminal devices 16 (FIG. 5) whereby the terminal devices are polled in a defined order. The polling sequence diagram as indicated by the numeral 82 includes a number of slots 85, each representing a time period during which a terminal device identified by the numerals located within the slot is polled. The letter N represents the number of terminal devices 16 connected to the communication line 14 (FIG. 5). The subdivisions represented by the numeral 88 indicate the time periods during which new terminal devices may be logged onto the network. The subdivisions 86 represent attempts by the base station to transmit a data frame when no acknowlegement is received from the designated terminal of receiving the transmitted data frame.

Figure 3:
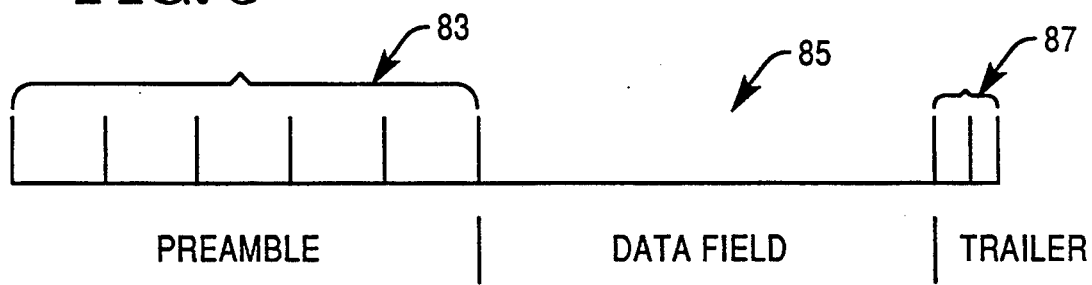
FIG. 3 is a diagrammatic representing of a information packet or frame of data transmitted between the base station and the terminal device.

Referring to FIG. 3, there is illustrated the construction of a data frame which includes a preamble portion 83, a data field 85 and a trailer portion 87.

Referring to FIG. 4A, there is shown a diagram of a dynamic table found in element 34 (FIG. 1) which includes a column 90 listing the terminal devices 16 which are known active in the data processing system. A second column 92 lists the valid channels for each of the terminal devices that were found to be free of interfering signals during the last transmission to the terminal device. There is also included a third column 93 which list invalid channels found during recent transmissions to the associated terminal device.

Referring to FIG. 4B, there is shown a diagram of the lookup table found in element 36 (FIG. 1) which includes a column 94 listing all the channels available to the base station for use in transmitting a data frame to the terminal devices. A second column 96 lists the center frequency of each of the channels found in column 94 for use by the base station in transmitting a data frame to the terminal devices.

Figure 6:
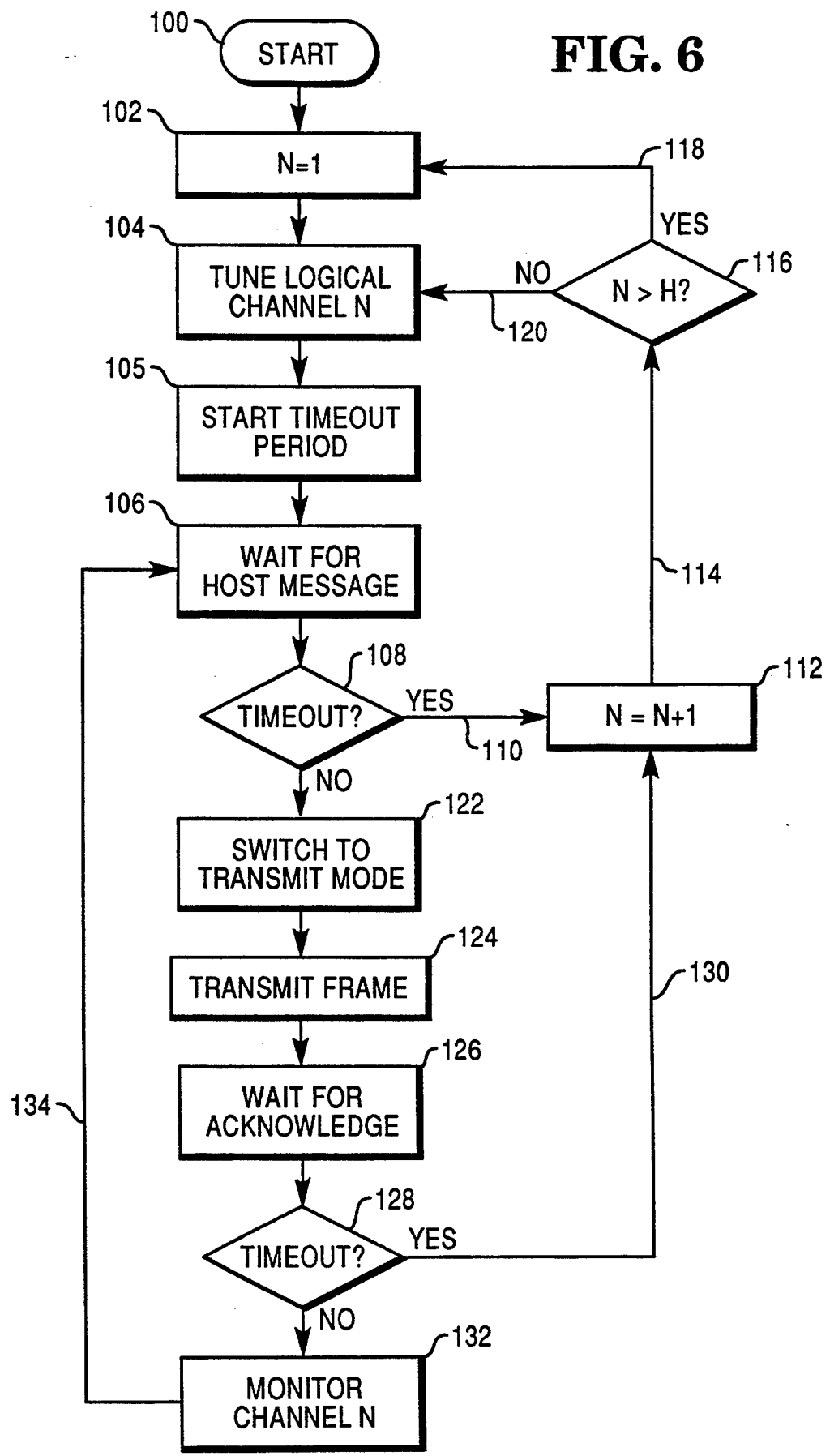
FIG. 6 is a flow diagram of the operation of a terminal device in detecting the presence of a message transmitted from the base station and transmitting a message to the base station.

Referring now to FIG. 6, there is shown a flow diagram of the operation of one of the terminal devices 16 in detecting the presence of a data frame transmitted from the base station 12. Basically, the terminal device must search for the base station's signal by tuning successive channels until the signal is found. The terminal device will start (block 100) by selecting a first channel (block 102) and tune to that channel (block 104). The terminal device then starts the running of a timeout period (block 105), then waits for the presence of the message from the base station or host (block 106) and then checks to see if the timeout has occurred (block 108). If a timeout has occurred before receiving a message on the selected channel indicating that the transmitted frame of data was lost, the terminal device will proceed over path 110 and selects the next higher channel (block 112). After selecting the channel, the terminal device proceeds over path 114 and checks to see if the selected channel is greater than the highest (H) channel available (block 116). If it is, the terminal device will return over path 118 to block 102 and repeat the tuning of the first channel.

If the selected channel (block 112) is not greater than the highest channel (block 116), the terminal device will return over path 120 and tune the selected channel (block 104), start the running of a time-out period (block 105) and wait for a message from the base station (block 106). This process is repeated until a message is received, resulting in the terminal device switching to the transmit mode (block 122), transmitting a data frame (block 124) over the communication line 14 (FIG. 5) to the base station 12 and waiting for the transmission of an acknowledgment from the base station (block 126). While waiting for such an acknowledgment, the terminal device will check to see if the timeout period has elapsed (block 128). If it has, the terminal device will return over path 130 to block 112 and select the next highest channel for tuning. If the timeout period has not elapsed, the terminal device will continue to monitor the channel (block 132) and return over path 134 to wait for an acknowledgment from the base station (block 106).

Figure 7:
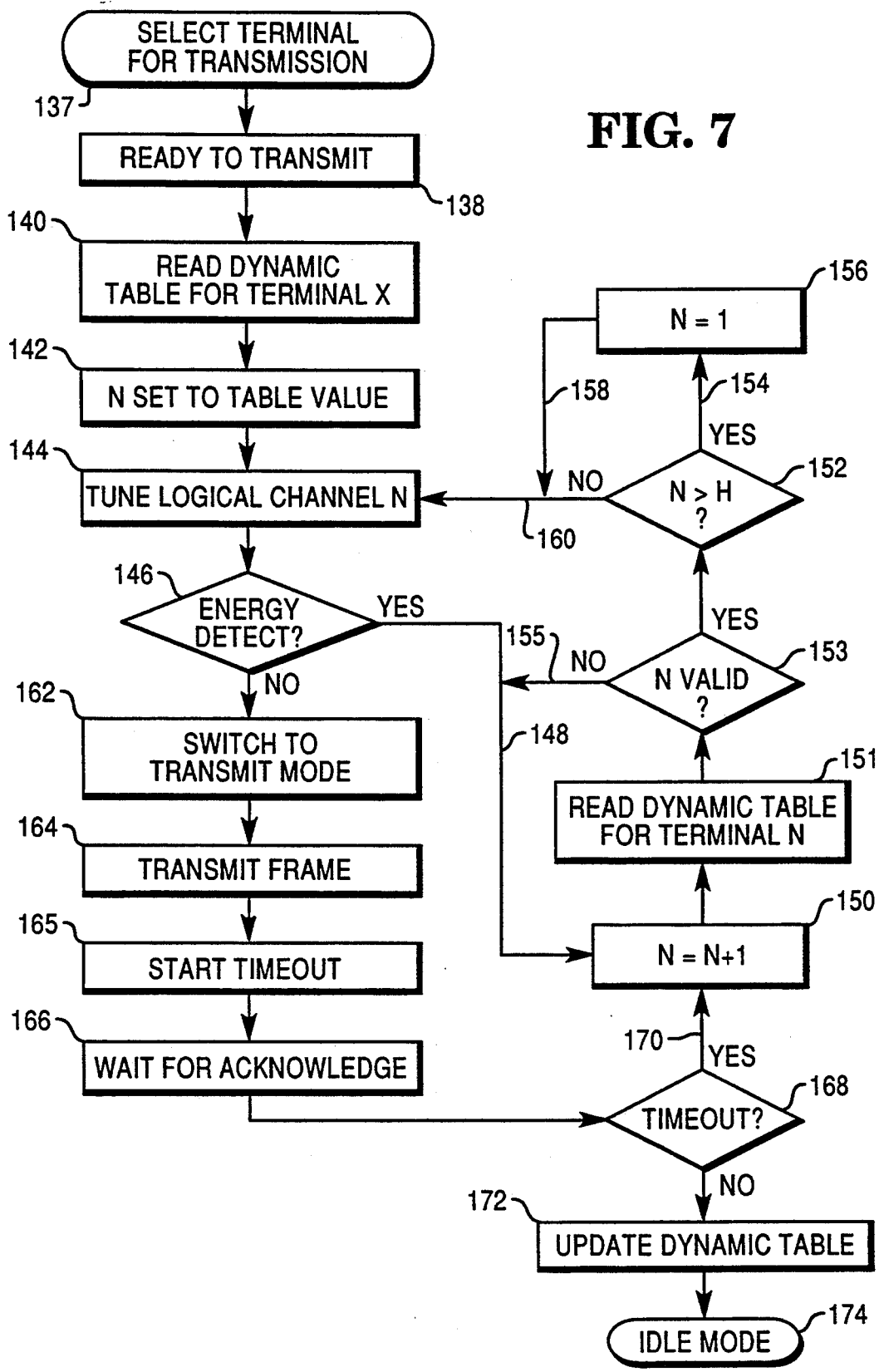
FIG. 7 is a flow diagram of the operation of the base station in transmitting a message to a remote terminal device and waiting for a response to the transmitted message.

Referring to FIG. 7, there is shown a flow diagram of the operation of the base station in transmitting a data frame to a remote terminal device. The base station will first select the remote terminal device to which a data frame is to be transmitted (block 137) and when ready to transmit (block 138), the base station will read the entry in the dynamic table 34 (FIG. 4A) associated with the designated terminal device (block 140) to determine the last channel (block 142) used for a successful communication to the terminal device (column 92)(FIG. 4A). The base station will look up the center frequency value in table 36 (FIG. 4B) associated with the selected channel and tune the frequency synthesizer element 56 (FIG. 1) to that frequency (block 144) and check if the energy detect element 72 (FIG. 1) has detected the presence of interfering signals in the selected channel (block 146). If it has, the base station will proceed over path 148 and select the next highest channel which is not listed as invalid in the dynamic table (block 150). The station will then lookup in table 34 (FIG. 1) the selected terminal (block 151) to see if the selected channel is valid for the selected terminal (block 153). If it not valid, the station will return over paths 155 and 148 to select the next highest channel (block 150). If the selected channel is valid, the station will check if the selected channel number was greater than the highest channel number (H) available (block 152). If it is, the base station will proceed over path 154 and select the first channel available (block 156) and proceed over paths 158 and 160 to tune the synthesizer element 56 (FIG. 1) to the frequency of the selected channel (block 144).

If the selected channel number was not greater than the largest channel number available (block 152), the base station will return over path 160 to tune the synthesizer element 56 to the frequency of the selected channel (block 144). If energy from interfering signals is not detected (block 146), the base station will switch to the transmit mode (block 162), transmit a data frame (block 164) over the communication line 14 to the designated terminal device 16, start the generation of a timeout period (block 165) and wait for the transmission of an acknowledgement from the terminal device (block 166). While waiting for such an acknowledgment, the base station will check to see if the timeout period has elapsed (block 168). If it has, the base station will return over path 170 to block 150 and select the next highest channel for tuning. If an acknowlegement from the terminal device is received before the timeout period has elapsed, the base station will update the dynamic table 34 (FIG. 4A)(block 172) and go into an idle mode (block 174).

It can thus be seen that there has been provided by the present invention a highly efficient method which provides reliable RF communications in frequency bands where interfering signals and/or multipath interference are present.

Although the presently preferred embodiment of the invention has been described, it will be understood that various changes may be made within the scope of the appended claims. Thus the present invention may be employed in continuous data systems, analog or digital communication systems. Where during a transmission the transmitting device finds that many errors are occurring, it is within the scope of the present invention to have the transmitting device mark up the dynamic table 34 (FIG. 4A) to indicate that such channel is not usable and find a channel which is available to continue the transmission.

What is claimed is:

1. A method for transmitting a packet of digital data over a communication channel from a first computer terminal to a second computer terminal in a computer network including the steps of:
   storing in a first table communication channels for the second computer terminal which were open during a last transmission of a first set of data to the second computer terminal;
   selecting from the first table a last communication channel which was successful in transmitting the first set of digital data from the first computer terminal to the second computer terminal; and
   transmitting a second set of digital data over the last communication channel from the first computer terminal to the second computer terminal.

2. The method of claim 1 which further includes the steps of:
   storing in a second table a frequency for each of the communication channels stored in the first table; and
   selecting the frequency from the second table for transmitting the second set of digital data to the second computer terminal from the first computer terminal corresponding to the last communication channel selected from the first table.

3. The method of claim 1 which further includes the step of storing in the first table communication channels that were not available for use in transmitting the first set of data at the time of the last transmission to the second computer terminal.

4. The method of claim 3 which further includes the steps of:
   detecting the occurrence of interfering signals on the last communication channel during the transmission of the second set of data from the first computer terminal to the second computer terminal;
   selecting from the first table a second communication channel which was successful in transmitting a third set of data previous to the first set of data from the first computer terminal to the second computer terminal; and
   transmitting the second set of data over the selected second communication channel from the first computer terminal to the second computer terminal.

5. The method of claim 4 in which the communication channels stored in the first table are stored in a numerical order and said step of selecting a second communication channel further includes the steps of:
   selecting from the first table the next highest numbered communication channel stored in said first table; and
   determining from the first table if the selected next highest numbered communication channel was successful in transmitting the second set of data from the first computer terminal to the second computer terminal.

6. A method for transmitting a packet of digital data over a transmission channel from a first computer terminal to a plurality of second computer terminals in a computer network including the steps of:
   storing in a first table communication channels for the second computer terminals which were open during a last transmission of a first set of data from the first computer terminal to the second computer terminals;
   selecting one of said plurality of second computer terminals to which a second set of data is to be sent;
   selecting from the first table a last communication channel which was successful in transmitting the first set of data from the first computer terminal to the one computer terminal; and
   transmitting the second set of data over the selected communication channel from the first computer terminal to the one computer terminal.

7. The method of claim 6 which further includes the steps of storing in a second table a frequency for each of the channels stored in the first table and selecting one of the frequencies from the second table for transmitting the second set of data from the first computer terminal to the one computer terminal by selecting the channel that corresponds to the one frequency.

8. The method of claim 6 which further includes the step of storing in the first table communication channels that were not available at the time of the last transmission of the first set of data to each of the second computer terminals.

9. The method of claim 8 which further includes the steps of:
   detecting the occurrence of interfering signals on the selected communication channel during the transmission of the second set of data from the first computer terminal to the one computer terminal;

selecting from the first table a second communication channel which was successful in transmitting the first set of data from the first computer terminal to the one computer terminal; and transmitting the second set of data over the selected second communication channel to the computer terminal.

10. A system for transmitting a digital packet of data between a first computer terminal and a second computer terminal in which each computer terminal includes transceiver means for transmitting and receiving the data, each computer terminal further including:

means for tuning to a selected channel for transmitting the data over the selected channel between the first and second computer terminals;

means for detecting the occurrence of interfering signals on the selected channel;

first table means listing each of the computer terminals in the system and communication channels that were found to be free of interfering signals in previous transmissions of previous data from the first computer terminal to the second computer terminal; and logic means coupled to said tuning means, said first table means and said detecting means for enabling said tuning means to tune to a second communication channel in response to the detection of interfering signals on the selected communication channel, said logic means selecting from the first table means the second communication channel that was found to be free of interfering signals in the previous transmissions of previous data to the second computer terminal.

11. The system of claim 10 which further includes a second table listing a transmission frequency for each of the communication channels listed in said first table, said logic means operating said tuning means to tune to the frequency listed in the second table for the second communication channel selected by said logic means.

12. The system of claim 10 in which said first table further lists communication channels that were found not to be free of interfering signals in the previous transmissions of previous data to the second computer terminal.

13. A method for transmitting data over a communication channel from a first data processing device to a second data processing device including the steps of:

storing in numerical order in a first table communications channels for the second data processing device which were open during a last transmission of a first set of data to the second processing device and channels that were not available for use at the time of the last transmission of the first set of data to the second data processing device;

selecting from the first table a last communication channel which was successful in transmitting the first set of data from the first data processing device to the second data processing device;

transmitting a second set of data over the last communication channel from the first data processing device to the second data processing device;

detecting the occurrence of interfering signals on the last communication channel during transmission of the second set of data from the first data processing device to the second data processing device;

selecting from the first table a second communication channel which was successful in transmitting a third set of data previous to the first set of data from the first data processing device to the second data processing device including the substeps of selecting from the first table the next highest numbered communication channel stored in the first table, and determining from the first table if the selected next highest numbered communication channel was successful in transmitting the third set of data from the first data processing device to the second data processing device; and transmitting the second set of data over the second communication channel from the first data processing device to the second data processing device.

* * * * *